United States Patent [19]

Kapany

[11] Patent Number: 4,755,017
[45] Date of Patent: Jul. 5, 1988

[54] CONSTRUCTION FOR FIBER OPTICS COMMUNICATIONS MODULES USING ELEMENTS BONDED ALONG ABUTTING FLAT SURFACES AND METHOD OF FABRICATING SAME

[75] Inventor: Narinder S. Kapany, Woodside, Calif.

[73] Assignee: Kaptron, Inc., Palo Alto, Calif.

[21] Appl. No.: 676,127

[22] Filed: Nov. 29, 1984

[51] Int. Cl.$^4$ .......................... G02B 6/32; H04B 9/00; B32B 17/00
[52] U.S. Cl. .............................. 350/96.18; 350/96.15; 350/96.17; 350/96.20; 350/320; 350/438; 350/442; 350/619; 350/620; 370/3; 156/60; 156/99
[58] Field of Search ............... 350/96.15, 96.16, 96.18, 350/96.19, 96.20, 96.21, 96.22, 96.17, 311, 417, 438, 439, 442, 444, 445, 320, 602, 603, 608, 619, 620, 625, 628; 272/8 M, 8.5, 13; 370/1, 2, 3, 4; 264/1.5, 1.4, 1.6, 1.7, 1.9; 156/60, 99, 108, 123

[56] References Cited

U.S. PATENT DOCUMENTS

| | | | |
|---|---|---|---|
| 4,103,989 | 8/1978 | Rosin | 350/199 |
| 4,206,537 | 6/1980 | Meginnis | 350/320 |
| 4,329,017 | 5/1982 | Kapany et al. | 350/96.15 |
| 4,479,697 | 10/1984 | Kapany et al. | 350/96.18 |
| 4,484,793 | 11/1984 | Laude | 350/96.20 |
| 4,549,782 | 10/1985 | Miller | 350/96.16 |

FOREIGN PATENT DOCUMENTS

| | | | |
|---|---|---|---|
| 2334969 | 7/1977 | France | 350/96.18 |
| 2435732 | 4/1980 | France . | |
| 0144317 | 10/1980 | German Democratic Rep. | 350/96.15 |
| 0148390 | 5/1981 | German Democratic Rep. . | |
| 58-205107 | 11/1983 | Japan | 350/96.18 |
| 354921 | 7/1961 | Switzerland | 350/291 |
| 2068585 | 8/1981 | United Kingdom | 350/96.18 |

*Primary Examiner*—William L. Sikes
*Assistant Examiner*—Brian M. Healy
*Attorney, Agent, or Firm*—Townsend & Townsend

[57] ABSTRACT

An alignment method and construction for fiber optics communication modules. A module includes a plano-convex element, a concave element, and a fiber-holding substrate. The plano-convex element has first and second surfaces. The first surface is flat; the second surface has a convex segment characterized by a self-conjugate plane coincident with the first surface and a surrounding flat segment parallel to the first surface. The concave element has a concave surface segment surrounded by a flat segment. When the flat segment of the concave element is bonded to the flat segment of the plano-convex element, the first surface of the latter is also a self-conjugate plane for the concave segment. The substrate has a first flat face that is bonded to the first surface of the plano-convex element and a second flat face having a fiber-receiving means therein. Batch assembly and alignment may be achieved by fabricating carrier elements containing arrays of the plano-convex elements or concave elements.

11 Claims, 4 Drawing Sheets

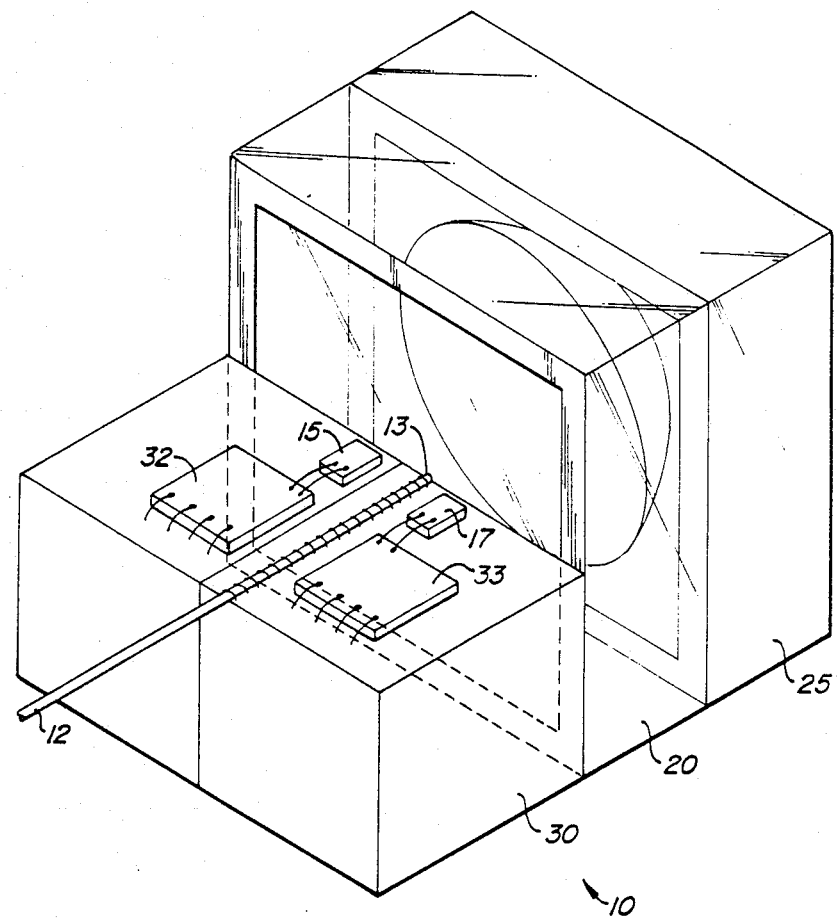
FIG._1.
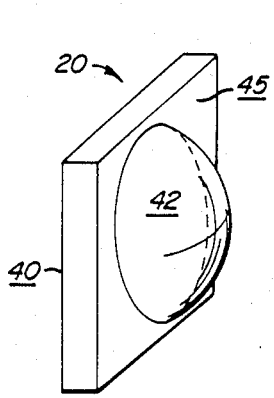
FIG._2.
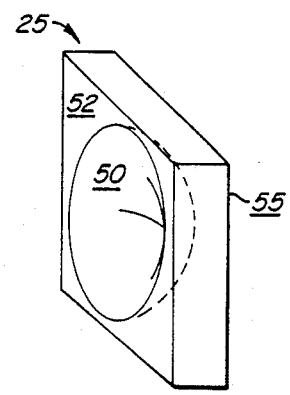
FIG._3.
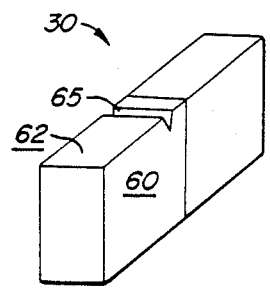
FIG._4.

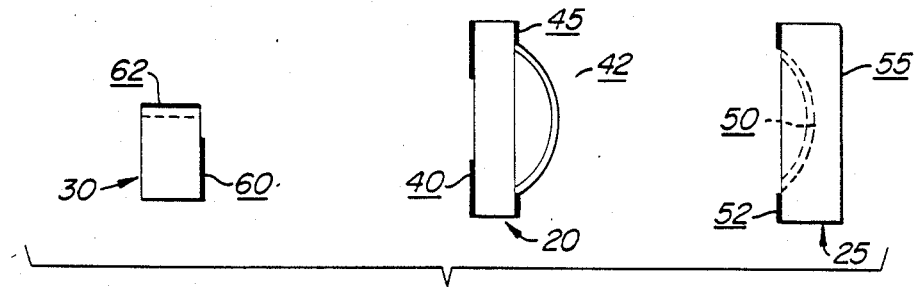
FIG._5A.
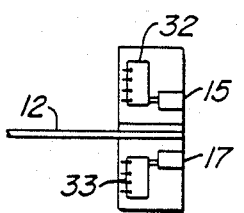
FIG._5B.
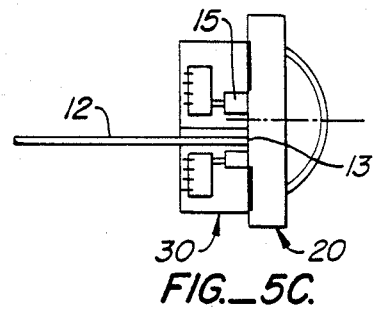
FIG._5C.
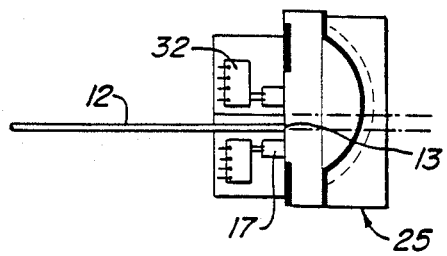
FIG._5D.
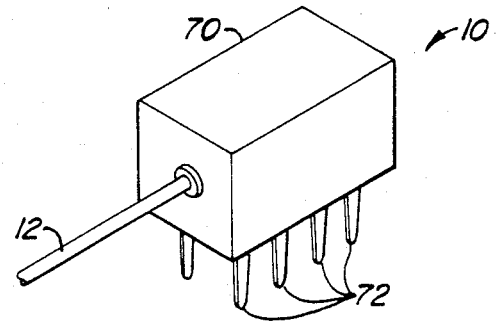
FIG._6.

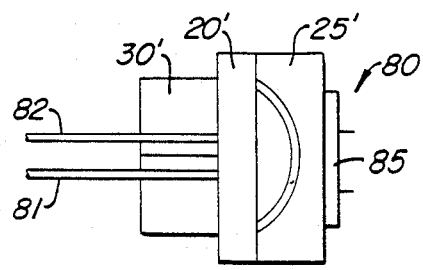
FIG._7A.
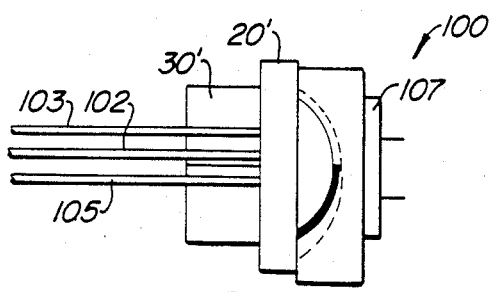
FIG._7C.
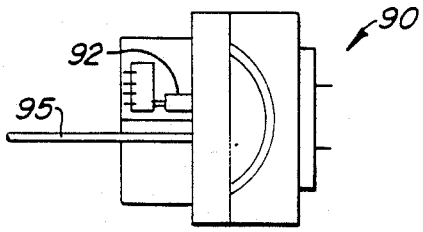
FIG._7B.
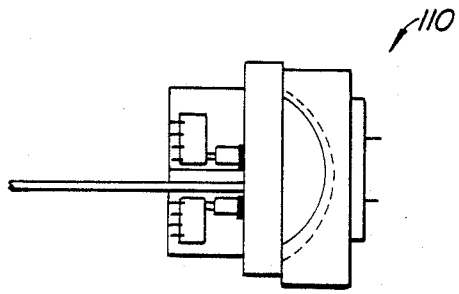
FIG._7D.
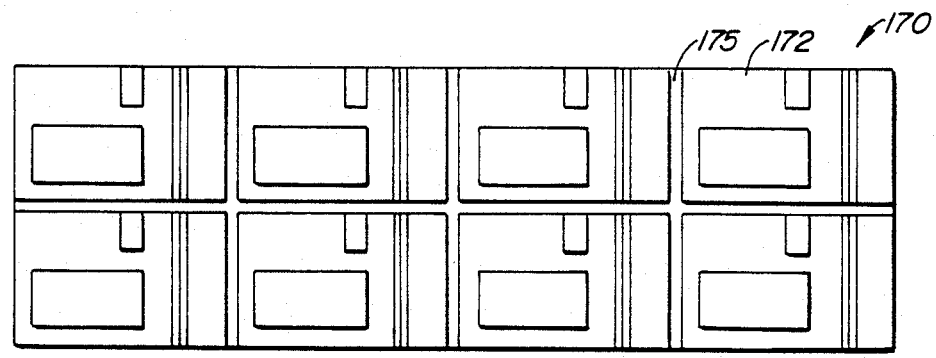
FIG._10A.
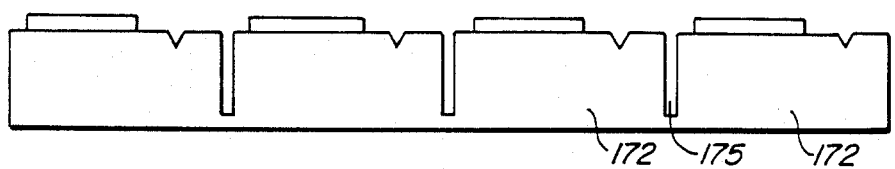
FIG._10B.

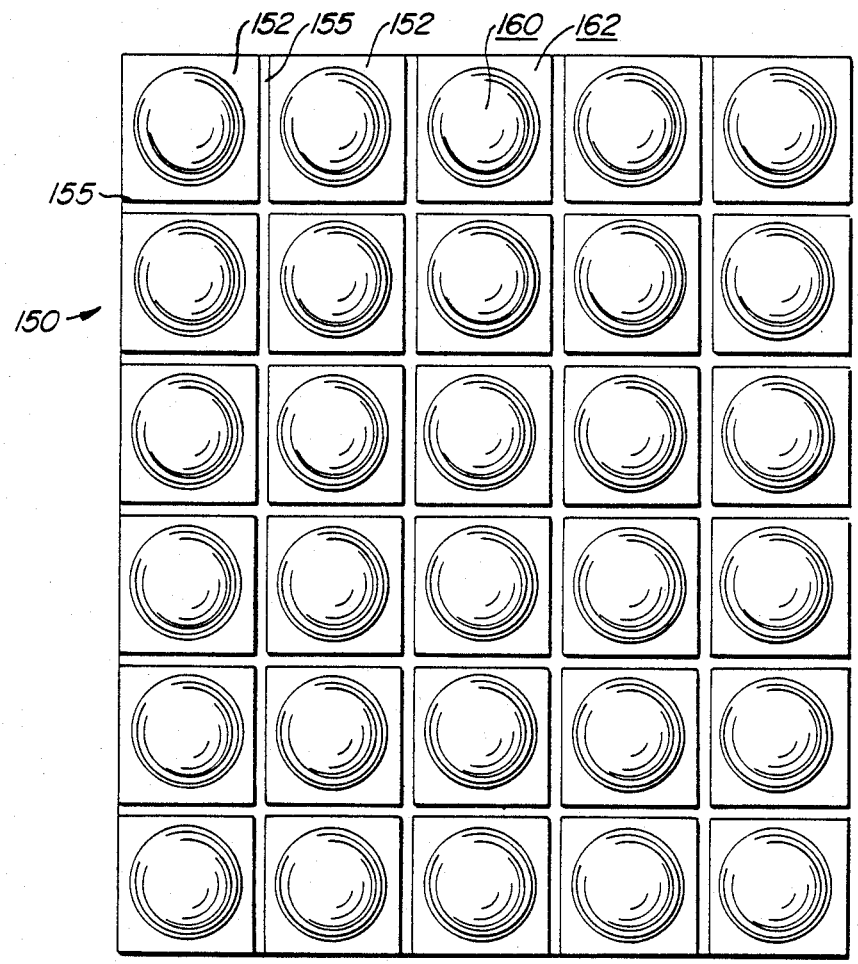
FIG._8.
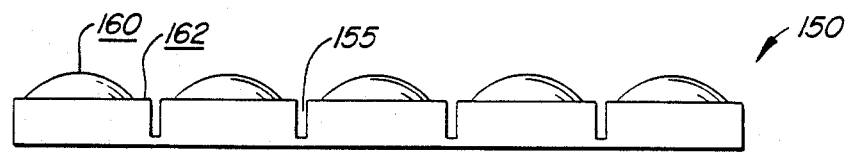
FIG._9A.
FIG._9B.

CONSTRUCTION FOR FIBER OPTICS COMMUNICATIONS MODULES USING ELEMENTS BONDED ALONG ABUTTING FLAT SURFACES AND METHOD OF FABRICATING SAME

FIELD OF THE INVENTION

The present invention relates generally to fiber optics communications modules for coupling light between fibers, sources, and detectors, and relates more specifically to a preferred construction for such modules.

BACKGROUND OF THE INVENTION

U.S. Pat. Nos. 4,329,017 and 4,479,697, the disclosures of which are hereby incorporated by reference, disclose a family of fiber optics communications modules utilizing curved, preferably spherical, imaging surfaces for coupling light between fibers, sources, and detectors. The modules utilize the advantageous properties of spherical reflectors when source and image are at closely spaced conjugate points. By using reflective, dichroic, and segmented coatings, a wide variety of devices including couplers, splitters, multiplexers, and demultiplexers may be achieved with the same basic geometry. The modules tend to be somewhat expensive, since the alignment and construction are relatively exacting processes. However, given the high performance of the modules, the price is not unreasonable. Similarly, while the modules represent an advance in miniaturization (being about 4 inches long by ½-inch in diameter), smaller devices are often desired. Were it possible to lower the costs by an order of magnitude or two, reduce the size, and retain the performance, the applicability of these devices could be greatly expanded.

SUMMARY OF THE INVENTION

The present invention provides a construction and fabrication method for fiber optics communications modules that lends itself to extreme miniaturization and batch processing, thereby allowing very small devices to be manufactured at low cost.

Briefly, the invention utilizes a hybrid approach with "building blocks" that are to a large extent self-aligning with respect to each other. Such building blocks include a plano-convex element that has: a first flat surface; and a second surface with a convex segment characterized by a self-conjugate plane coincident with the first surface, and a flat segment parallel to the first surface. The flat segment preferably surrounds and abuts the convex segment, but this is not necessary. An additional building block for this family of devices is a concave element that is bounded by a surface having a concave segment and a flat segment. When the flat segment of the concave element is bonded to the flat segment of the plano-convex element, the first surface is also a self-conjugate plane for the concave segment. The third building block is a substrate to which sources, detectors, and fibers may be bonded.

A typical device requires that first and second points be conjugate with respect to the convex segment, and that the first point and a third point be conjugate with respect to the concave segment. According to a preferred assembly method, a substrate subassembly is aligned relative to the plano-convex element so that the first and second points (for example, a source and a fiber end) are at conjugate locations with respect to the convex segment. The concave element is then moved into position with the respective flat segments in contact, and moved transversely to achieve the position where the first and third points are conjugate with respect to the concave segment.

It will be appreciated that the construction wherein each of the curved surfaces has an associated flat segment that aligns such surface with respect to the common self-conjugate plane considerably simplifies the alignment process. Once the elements are bonded together, as by soldering or cementing, the overall structure is very rugged being, in effect, unitary.

According to a further aspect of the invention, each of the building blocks may be constructed as a member of a regularly spaced array. Thus, in order to fabricate fiber optics coupler modules of the type having first and second spherical segment reflectors disposed with respective centers of curvature slightly displaced from one another, there is provided a first carrier element whose sub-elements define an array of individual plano-convex elements, and a second carrier element whose sub-elements define the corresponding array of concave elements. The flat segments of the first and second carrier elements may be put into contact, and subject to manufacturing tolerances in the carrier elements themselves, whole arrays of devices may be aligned at once.

A further understanding of the nature and advantages of the present invention may be realized by reference to the remaining portions of the specification and attached drawings.

BRIEF DESCRIPTION OF THE DRAWINGS

FIG. 1 is an isometric view of the optical and electronic components of a multiplexer according to the present invention;

FIG. 2 is an oblique view of a plano-convex element according to the invention;

FIG. 3 is an oblique view of a concave element according to the present invention;

FIG. 4 is an oblique view of a substrate element according to the present invention;

FIGS. 5A–D are schematic views showing an assembly and alignment procedure for the multiplexer of FIG. 1;

FIG. 6 is an isometric view showing a preferred packaging for the multiplexer;

FIGS. 7A–D are schematic views of other devices that may be built with generally the same construction;

FIG. 8 is a top view of a carrier element that defines an array of spherical reflector segments;

FIGS. 9A and 9B are side views illustrating the array for the plano-convex and concave cases, respectively; and FIGS. 10A and 10B are top and side views of a carrier element that defines an array of substrate elements.

DESCRIPTION OF THE PREFERRED EMBODIMENT

FIG. 1 is an isometric view of the operative components of a multiplexer 10 constructed according to the present invention. As described in U.S. Pat. No. 4,479,697, such a multiplexer is one of the devices in a family utilizing reflective imaging surfaces to couple light between fibers, sources, and detectors. The particular multiplexer embodiment operates to inject light of first and second wavelengths into a fiber 12 having an end 13. The light of the two wavelengths is provided by appropriate sources 15 and 17. The multiplexer is configured with first and second serially disposed imaging reflective surfaces. Source 15 and fiber end 13 are at optically conjugate locations with respect to the first imaging surface which reflects light of the first wavelength but transmits light of the second wavelength. Source 17 and fiber end 13 are optically conjugate with respect to the second imaging surface which reflects light of the second wavelength.

In accordance with the present invention, multiplexer 10 is formed from three main elements, a plano-convex element 20, a concave element 25, and a substrate 30. Plano-convex element 20 provides the first imaging surface. Concave element 25 provides the second imaging surface. Substrate 30, which may be formed from two substrate sub-elements, has fiber 12 and sources 15 and 17 mounted thereon. Substrate 30 may also carry appropriate additional electronic components such as drivers or amplifiers 32 and 33.

FIG. 2 is an isometric view illustrating a preferred construction for plano-convex element 20. Plano-convex element 20 is formed of optically transparent material (glass, quartz, plastic) and is bounded by first and second surfaces. The first surface is a flat surface 40 while the second surface has a convex segment 42 and a flat segment 45.

Convex surface 42 is characterized by a self-conjugate plane that is coincident with the plane of flat surface 40. That is, a point source of light emanating from a point in plane 40, when reflected at segment 42, is imaged at a conjugate point in the plane of surface 40. In the preferred embodiment, convex segment 42 is spherical, whereupon the center of curvature of segment 42 lies in the plane of surface 40. Convex segment 42 carries a dichroic coating that reflects light of the first wavelength and transmits light of the second wavelength.

Flat segment 45 preferably abuts and surrounds convex segment 42, but this is not necessary. Flat segment 45 is parallel to the plane of surface 40. Flat segment 45 is preferably metallized where the elements are to be bonded by soldering. The peripheral regions of surface 40 are also metallized. Alternately, the elements could be cemented, in which case metallization is not needed.

FIG. 3 is an isometric view of concave element 25. Although many applications do not require that element 25 be of transparent material, considerations of versatility and interchangeability dictate that it also be made of optically transparent material. A first surface of element 25 includes a concave segment 50 and a surrounding, preferably abutting, flat segment 52. Element 25 is also bounded by a second surface 55. While the configuration of second surface 55 is irrelevant for many applications, considerations of interchangeability dictate that this be a flat surface parallel to the plane of flat segment 52. Concave segment 50 carries a coating (metal or dielectric) that is reflective for light of the second wavelength. Flat segment 52 is preferably metallized for soldering, as are the peripheral regions of second surface 55. Concave segment 50 is configured so that when flat segment 52 is bonded to flat segment 45 of element 20, the center of curvature of segment 50 lies in the plane of surface 40. Thus, when the elements 20 and 25 are bonded together along their respective flat segments, surface 40 is a self-conjugate plane with respect to both convex segment 42 and concave segment 50.

FIG. 4 is an isometric view of substrate 30. Substrate 30 is a rectangular block having first and second perpendicular flat surfaces 60 and 62. Surface 62 is formed with a groove 65 which is preferably a V-groove. Surfaces 60 and 62 are preferably metallized for soldering.

Substrate 30 may be formed of material such as sapphire, beryllia, copper, molybdenum or Kovar alloy (49% nickel, 4% cobalt, 47% iron). The latter is desirable in that its thermal characteristics closely match those of glass, and while it has poor thermal conductivity, such may be enhanced by plating of high thermally conductive material.

FIGS. 5A–D illustrate a sequence for assembly and alignment of elements 20, 25, and 30 to form the finished multiplexer illustrated in FIG. 1. FIG. 5A shows the elements prior to assembly with their respective metallized portions greatly exaggerated in thickness. FIG. 5B shows substrate 30 onto which sources 15 and 17 and amplifiers 32 and 33 have been bonded. Additionally, fiber 12, having been previously metallized, has been soldered into groove 65.

FIG. 5C shows the next step, which is a first alignment step wherein flat surface 40 of plano-convex element 20 is placed against flat surface 60 of substrate 30. The positioning is such that the center of curvature of convex segment 42 lies symmetrically between fiber end 13 and source 15 so that light of the first wavelength from source 15 is imaged at fiber end 13. Once this condition has been reached, elements 30 and 20 are bonded.

FIG. 5D shows a second alignment step wherein flat segment 52 of concave element 25 is placed against flat segment 45 of plano-convex element 20 with the center of curvature of concave segment 50 lying between fiber end 13 and source 17. Thus, light of the second wavelength from source 17 passes through the dichroic coating on element 20, is reflected by the reflective coating on concave segment 50, and is imaged on fiber end 13.

Although the present invention may be implemented over a certain range of dimensions, an important factor in the present invention is that a high degree of miniaturization is possible. FIG. 6 shows a preferred final packaging for multiplexer 10, the internal components of which are shown in FIG. 1. More particularly, the components illustrated in FIG. 1 are preferably contained within a package 70 having dimensions generally approximately 0.5 inches in length, 0.3 inches in width, and 0.2 inches in height (or thickness). The leads from amplifiers 32 and 33 are communicated outside package 70 to a set of pins 72. Such pins are preferably spaced 0.1-inch centers, thereby matching a normal integrated circuit package configuration.

The radius of curvature of convex segment 42 is generally on the order of 3 mm and the convex surface segment subtends a cone half-angle of about 15 degrees. Where element 20 is square in its transverse configuration, a 2–3 mm dimension is large enough to provide an adequate bonding surface. The radius of concave surface segment 50 on concave element 25 must be slightly larger than the radius of convex segment 42 in order to allow element 25 to be moved transversely for alignment as described above. Although the thickness of concave element 25 is not determined by the other dimensions, it is preferably relatively thin if a detector is to be placed on surface 55.

FIGS. 7A–7D illustrate additional fiber optics coupler modules that may be constructed in a similar manner. Primed reference numerals will be used for elements corresponding to elements 20, 25, and 30 of multiplexer 10.

FIG. 7A shows a coupler/monitor 80 wherein light emanating from a first fiber 81 is transmitted substantially entirely into a second fiber 82. In this instance, substrate 30' has two V-grooves to accommodate the two fibers. Plano-convex element 20' is coated so as to reflect most of the incident light but to allow a small portion (perhaps a few percent) through. Concave element 25' only operates as a mounting block. Thus, the concave surface is not coated, or may carry an anti-reflection coating. A large-area detector 85 is mounted to the downstream surface of concave element 25' to provide an output signal representative of the light intensity on either fiber.

FIG. 7B shows a coupler 90 which operates to couple light between a source 92 and a fiber 95.

FIG. 7C is a schematic view of a splitter/monitor 100. Splitter 100 operates to communicate a fraction (typically 50%) of the light emanating from an input fiber 102 to a first output fiber 103 and the remaining light to a second output fiber 105. In this instance, substrate 30' has three V-grooves to accommodate the three fibers. The convex surface segment on plano-convex element 20' has one-half its area reflectively coated so as to intercept one-half of the cone angle emanating from fiber 102 for imaging on fiber 103. The remaining portion of the light cone passes to the concave surface for imaging onto fiber 105. A small fraction of the light may be allowed to pass to a detector 107.

FIG. 7D illustrates a demultiplexer 110 which differs from the multiplexer 10 in that the sources, which may be edge-emitting LED's or lasers, are replaced by detectors such as edge detectors. Such detectors are approximately 4 mils (100 microns) wide, 8 mils long, and 4 mils thick.

The construction described above lends itself to batch processing wherein mass production of such optical couplers becomes feasible. Briefly, this is accomplished by fabricating the plano-convex element, the concave element, and the substrate each as members of a respective carrier element defining an array of identically configured elements. FIG. 8 is a plan view of a carrier element 150 comprising individual elements 152, located so as to define a rectangular matrix. The individual elements are separated by a plurality of grooves 155 that allow the array, when bent along one of the grooves, to be broken into individual elements. Each of elements 152 includes a central curved surface segment 160 and a surrounding, preferably abutting flat segment 162.

FIG. 9A is a side view of carrier element 150 for the situation where curved segment 160 is convex. In such a case, the individual elements 152 correspond to plano-convex element 20 of FIG. 2. FIG. 9B is a side view illustrating the circumstance where curved segment 160 is concave. In such a case, the individual elements correspond to concave element 25 of FIG. 3.

FIG. 10A shows an array 170 of substrate sub-assemblies 172 to which source and amplifier chips have been bonded. The individual elements 172 are again separated by deep grooves 175.

Carrier element 150 can be manufactured by a molding process, a grinding and polishing process, or by an etching and fire polishing process. The etching and fire polishing process has the advantage that precise spacing to a tolerance on the order of 1 micron can be achieved. The other processes are more likely to have larger tolerances that may limit the extent to which full batch processing is possible. The grooves are preferably generated by a sawing step, carried out before any coating steps since a deep, thin groove can be achieved.

Regardless of the ultimate alignment process, it is clear that the manufacture of the elements in arrays has significant advantages in the fabrication. At a minimum, inspection, coating, cleaning, shipping, and general handling may be done on an array basis rather than on an individual part basis, with considerable savings in cost.

The alignment and assembly sequence described in connection with FIGS. 5A-D requires two alignment steps, namely alignment of the plano-convex element relative to the substrate and then alignment of the concave element relative to the bonded subassembly. If the arrays are made on identical center-to-center spacing, the alignment steps may be carried out on a batch basis. More particularly, a linear array of substrates can be aligned with a row from the array of plano-convex elements merely by ensuring that two of the individual elements are themselves aligned. It is noted that since the source or detector has dimensions on the order of 4 mils (100 microns), which is larger than the diameter of the fiber core (50 microns), effective coupling will occur even if the center of the fiber and the center of the source (or detector) are not perfectly symmetrically located with respect to the center of curvature of the spherical surface.

In a similar manner, the concave elements can be aligned on a batch basis. In principle, the entire rectangular array could be aligned in one shot, although using linear arrays typically provides better yields.

For those applications where the center-to-center spacing of the elements in the various arrays is not precise or uniform enough to allow batch fabrication as described above, handling is nevertheless greatly facilitated. For example, the array of plano-convex elements could be mounted on an indexing mechanism and substrates aligned therewith one at a time.

In summary, it can be seen that the present invention provides a construction for the sub-elements of a family of fiber optics communications modules that allows the assembly and fabrication to be done on a batch basis. The structure of the parts allows extreme miniaturization so that the module can occupy a package size similar to conventional integrated circuits.

While the above is a full and complete description of the preferred embodiments of the present invention, modifications, alternate constructions, and equivalents may be employed without departing from the spirit of the invention. For example, while a hybrid structure showing separate integrated circuit and discrete elements mounted to the substrate was disclosed, the substrate could be monolithic. Additionally, while rectangular arrays are shown, other geometries such as close-packed hexagonal could be used. Therefore, the above descriptions and illustrations should not be taken as limiting the scope of the present invention which is defined by the appended claims.

What is claimed is:

1. In a fiber optics coupler module of the type having an optical fiber end registered relative to first and second curved reflectors, an improved construction comprising:

a plano-convex element having (a) a first surface which is flat and lies in a first plane, and (b) a second surface which includes (i) a convex segment characterized by said first plane being a self-conjugate plane for said convex segment, and (ii) a first flat segment lying in a second plane parallel to and spaced from said first plane by a predetermined distance;

said plano-convex element being formed of a material that is transparent for a range of wavelengths and carrying a first coating on said convex segment that is at least partly reflective for at least one wavelength in said range, said first coating defining the first reflector; and a concave element having a surface which includes a concave segment and a second flat segment, said second flat segment being disposed so that said first plane is a self-conjugate plane for said concave segment when said second flat segment contacts said first flat segment;

said concave element carrying a second coating on said concave segment that is at least partly reflective for at least one wavelength in said range, said second coating defining the second reflector;

said plano-convex element and said concave element being bonded together over an interface with said first and second flat segments substantially abutting.

2. The improved construction of claim 1 wherein said first flat segment abuts said convex segment.

3. The improved construction of claim 1 wherein said second flat segment abuts said concave segment.

4. A method of fabricating fiber optics coupler modules, each of the type having first and second spherical segment reflectors disposed with respective centers of curvature slightly displaced from one another, comprising the steps of:

providing a first carrier element having (a) a first, flat surface lying in a first plane, and (b) a second surface which includes (i) a flat portion lying in a second plane parallel to the first plane, and (ii) a plurality of convex spherical segments having respective centers of curvature lying in the first plane and defining a first array therein;

providing a second carrier element having a surface which includes a flat portion and a plurality of concave spherical segments disposed such that when the flat portion of the second carrier element contacts the flat portion of the second surface of the first carrier element, the respective centers of curvature of the concave spherical segments lie in the first plane of the first carrier element and define a second array corresponding to the first array;

placing the flat portions of the first and second carrier elements into substantial contact;

aligning the first and second carrier elements so that at least two of the centers of curvature of the concave surface segments are at a predetermined desired distance from corresponding ones of the centers of curvature of the convex surface segments; and bonding the first and second carrier elements, so aligned, along the contacting flat portions thereof to provide a rigid assembly.

5. The method of claim 4, and further comprising the step, carried out after said bonding step, of dicing the bonded assembly to provide a plurality of individual modules.

6. The improved construction of claim 1, and further comprising:

a body of solid material bounded by first and second perpendicular flat faces, said first flat face being bonded to said first surface of said plano-convex element, said body being formed so as to define a groove in said second flat face for accepting an optical fiber.

7. The improved construction of claim 1, and further comprising:

a body of solid material bounded by first and second perpendicular flat faces, said first flat face being bonded to said first surface of said plano-convex element, said body being formed so as to define a plurality of grooves in said second flat face for accepting respective optical fibers so that the fibers can be bonded with respective ends thereof lying at spaced locations in said first plane.

8. The improved construction of claim 1, and further comprising:

a body of solid material formed with a first flat face bonded to said first surface of said plano-convex element and also formed with a second flat face having a groove;

an optical fiber disposed along said groove and bonded thereinto; and a light source or detector bonded to said second flat face.

9. The invention of claim 6 or 7 or 8 wherein said body is formed of a material in the group consisting of sapphire, beryllia, copper, molybdenum, and nickel-iron-cobalt alloy.

10. The invention of claim 6 or 7 or 8 wherein said first flat face and said first surface are metallized and soldered together.

11. In a fiber optics coupler module of the type having an optical fiber end registered relative to first and second spherical reflectors disposed with their respective centers of curvature slightly displaced from one another and from the fiber end, an improved construction comprising:

a plano-convex element having (a) a first flat element surface lying in a first plane, and (b) a second element surface which includes (i) a convex spherical segment characterized by a center of curvature lying in said first plane, and (ii) a first flat segment lying in a second plane parallel to and spaced from said first plane by a predetermined distance;

said plano-convex element being formed of a material that is transparent for a range of wavelengths and carrying a first coating on said convex spherical segment that is at least partly reflective for at least one wavelength in said range, said first coating defining the first reflector;

a concave element having a third element surface which includes a concave spherical segment and a second flat segment, disposed so that the center of curvature of said concave segment lies in said first plane when said second flat segment contacts said first flat segment;

said concave element carrying a second coating on said concave segment that is at least partly reflective for at least one wavelength in said range, said second coating defining the second reflector; and a substrate element having first and second flat substrate surfaces, said substrate element being formed with a groove in said second flat substrate surface to receive a fiber;

said plano-convex element and said concave element being bonded together over an interface with said first and second flat segments substantially abutting;

said substrate element and said plano-convex element being bonded together over an interface with said first flat substrate surface and said first flat element surface substantially abutting;

the fiber being bonded in said groove to locate the fiber end relative to the first and second reflectors.

* * * * *